United States Patent [19]

Tani

[11] Patent Number: 5,480,359
[45] Date of Patent: Jan. 2, 1996

[54] BICYCLE CHAIN WHEEL ASSEMBLY AND CRANK ARM

[75] Inventor: Masahiko Tani, Sakai, Japan

[73] Assignee: Shimano Inc., Osaka, Japan

[21] Appl. No.: 205,412

[22] Filed: Mar. 3, 1994

[30] Foreign Application Priority Data

Mar. 9, 1993 [JP] Japan .................. 5-009787 U

[51] Int. Cl.⁶ .................................. F16H 55/12
[52] U.S. Cl. .................. 474/160; 74/447; 74/594.2
[58] Field of Search .................... 474/152, 160; 74/447, 594.2

[56] References Cited

U.S. PATENT DOCUMENTS

| | | | |
|---|---|---|---|
| 3,815,439 | 6/1974 | Tarutani | 474/160 X |
| 4,009,621 | 3/1977 | Segawa | 74/447 X |
| 4,380,445 | 4/1983 | Shimano | 474/160 X |
| 4,439,172 | 3/1984 | Segawa | 474/160 |
| 5,085,620 | 2/1992 | Nagano | 474/152 |

FOREIGN PATENT DOCUMENTS

| | | |
|---|---|---|
| 431573 | 6/1991 | European Pat. Off. . |
| 508328 | 10/1992 | European Pat. Off. . |
| 704207 | 2/1954 | United Kingdom . |

*Primary Examiner*—Roger J. Schoeppel
*Attorney, Agent, or Firm*—Dickstein, Shapiro & Morin

[57] ABSTRACT

A chain wheel assembly for a bicycle includes a large chain wheel, a small chain wheel, and a crank arm for supporting the chain wheels. The crank arm has an arm body, a boss for connecting the crank arm to a crank axle of the bicycle, and wheel mounting extensions extending radially outwardly from the boss. The small chain wheel is connected to the crank arm through a first connecting device provided on the wheel mounting extensions. The large chain wheel is connected to the small chain wheel through a second connecting device arranged radially outwardly of the first connecting device. The large chain wheel is connected to the crank arm only through the second connecting device and small chain wheel.

9 Claims, 7 Drawing Sheets

BICYCLE CHAIN WHEEL ASSEMBLY AND CRANK ARM

BACKGROUND OF THE INVENTION

1. Field of the Invention

The present invention relates to a chain wheel assembly for a bicycle having at least one large chain wheel, at least one small chain wheel, and a crank arm for driving the chain wheels, and to the crank arm for use with this chain wheel assembly.

2. Description of the Related Art

Figure 13:
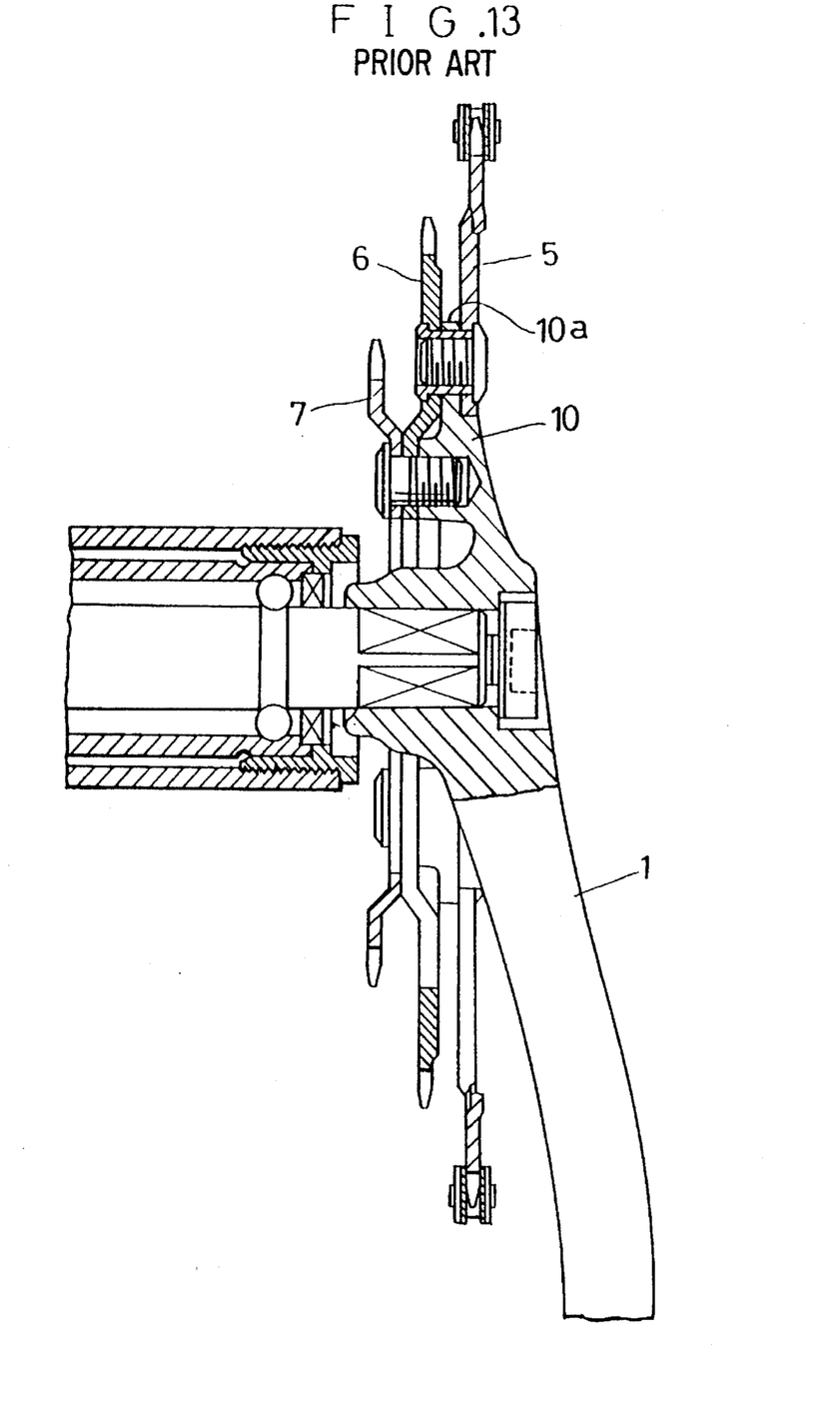
FIG. 13 is a sectional view of a conventional chain wheel assembly.

In a conventional chain wheel assembly, as shown in FIG. 13, a crank arm 1 includes a wheel mount 10 having a connecting portion 10a for connecting a large chain wheel 5. Thus, the large chain wheel 5 is connected directly to the crank arm 1.

With the above conventional structure, where the large chain wheel has an increased inside diameter to be lightweight, the wheel mount of the crank arm must extend to a large extent from a boss of the crank arm connected to a crank axle. Consequently, when such crank arms are manufactured by casting, unacceptable products often occur for lack of molten metal reaching corners of dies to form the wheel mount. In the case of forging, a large quantity of material is needed to obtain large crank arms. This results in an increased material cost, and a troublesome manufacturing process with an additional operation to cut the forged crank arms to shape.

SUMMARY OF THE INVENTION

An object of the present invention is to provide a chain wheel assembly for a bicycle which may be formed lightweight, with excellent appearance and strength, and with a high degree of precision and facility.

Another object of the invention is to provide a crank arm which may advantageously be used with this chain wheel assembly.

The above objects are fulfilled, according to the present invention, by a chain wheel assembly for a bicycle as noted in the outset hereof, wherein the small chain wheel is connected through a first connecting device to wheel mounting extensions of the crank arm, and the large chain wheel is connected through a second connecting device only to the small chain wheel, i.e. the large chain wheel is connected to the crank arm only through the second connecting device and small chain wheel.

A bicycle crank arm according to the present invention comprises five wheel mounting extensions extending radially outwardly from a boss and defining end surfaces describing an imaginary circle having a diameter up to 95 mm.

The present invention has the following functions and effects.

In the above chain wheel assembly for a bicycle in which the large chain wheel is connected to the crank arm through the small chain wheel, the wheel mounting extensions of the crank arm need no coupling device for connecting the large chain wheel. That is, even where the large chain wheel has coupling legs defining an increased inside diameter, the large chain wheel may be connected to the crank arm while allowing the wheel mounting extensions to have a smaller length from the crank axle coupling boss than in the prior art.

Where the end surfaces of the wheel mounting extensions of the crank arm are placed in contact with end surfaces of the coupling legs of the large chain wheel, not only an improved outward appearance is attained but a great drive load acting on the large chain wheel is effectively received and borne by the crank arm. Where the large chain wheel is indirectly supported by the crank arm through the small chain wheel, an increased tolerance of manufacture is allowed at least for positions of the end surfaces of the wheel mounting extensions of the crank arm and of the end surfaces of the coupling legs of the large chain wheel, which provides the advantage of manufacturing easiness. Where these end surfaces are arranged adjacent, though out of contact with, each other, outer lateral surfaces and side edges of the chain wheel and crank arm may present a smooth continuity having an excellent appearance.

The bicycle crank arm according to the present invention has wheel connecting portions arranged to provide relatively large spaces from a crank axle receiving tubular portion. This arrangement provides relatively large operating spaces adjacent the wheel connecting portions for facility of an operation to attach the chain wheels. This feature is assured while limiting the length of the wheel mounting extensions from the boss to such an extent as to place the end surfaces of the extensions on the imaginary circle noted above. Moreover, the crank axle receiving tubular portion may have a relatively large wall thickness.

In the above chain wheel assembly, the wheel mounting extensions may have a reduced length despite the increased inside diameter of the large chain wheel. This provides the advantage of allowing the large chain wheel to be formed lightweight, and the advantage of allowing the crank arm to be formed at low cost, easily and efficiently in that forming errors are avoided with ease, a reduced quantity of material is needed, and a shaping operation is no longer required after formation.

In addition, the feature that the coupling legs of the large chain wheel are arranged adjacent the wheel mounting extensions of the crank arm assures advantages in outward appearance and strength, thereby promoting commercial value and durability.

The chain wheel assembly using the crank arm according to the present invention is easy to assemble from the viewpoint of connection between chain wheels and crank arm, with an increased boss strength enabling a reliable connection to the crank axle.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
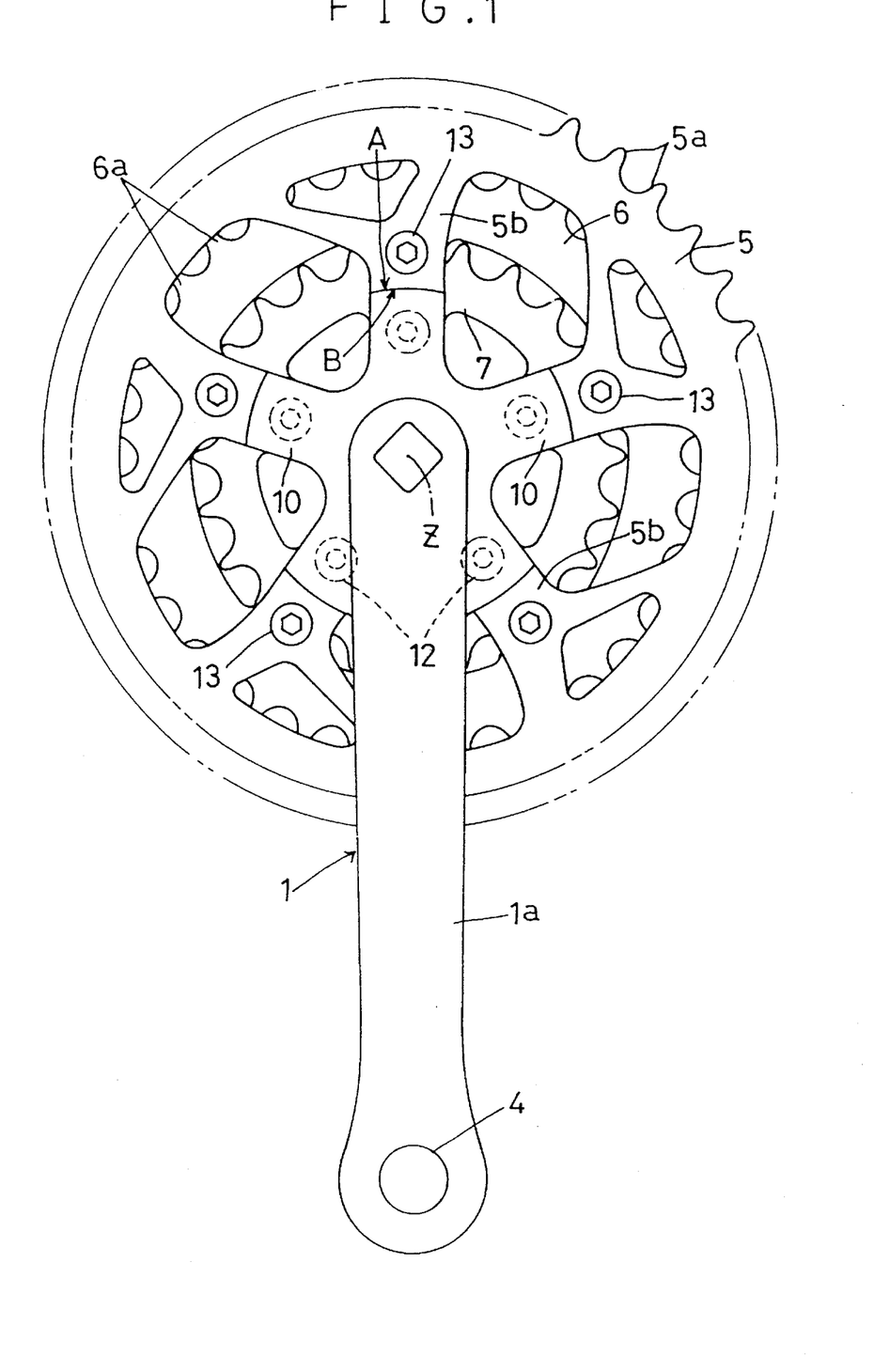
FIG. 1 is a side view of a chain wheel assembly for a bicycle according to the present invention.
Figure 2:
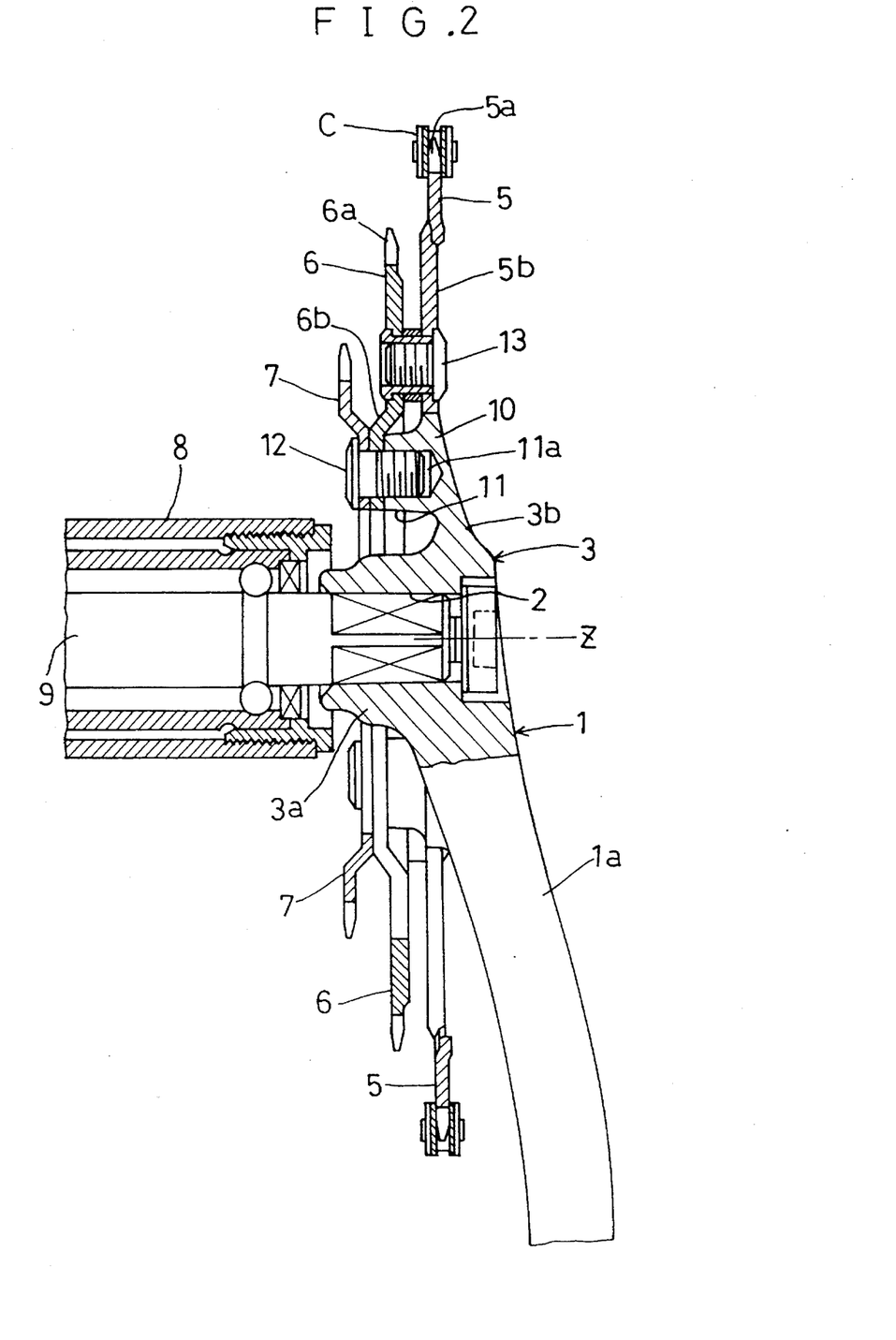
FIG. 2 is a sectional view of the chain wheel assembly.

As shown in FIGS. 1 and 2, a bicycle crank arm 1 formed by forging aluminum alloy includes an arm body 1a, and a crank axle connecting boss 3 integral with the arm body 1a. The boss 3 includes a tubular portion 3a projecting backward from one end of the arm body 1a and defining a crank axle connecting bore 2, and a flange portion 3b continuous from the tubular portion 3a. The arm body 1 a has a pedal mounting bore 4 formed in the other end thereof. The crank arm 1 carries, on one end portion thereof, a large, high speed chain wheel 5, an intermediate speed chain wheel 6 smaller than the high speed chain wheel 5, and a low speed chain wheel 7 smaller than the intermediate speed chain wheel 6, which constitute a bicycle chain wheel assembly for providing three speeds. Specifically, as shown in FIG. 2, the crank arm 1 is connected through the boss 3 to a crank axle 9 supported in a bottom bracket 8 of a bicycle frame. The crank arm 1 is turned to drive the chain wheels 5–7 for transmitting drive to a rear wheel through a chain C.

Figure 3:
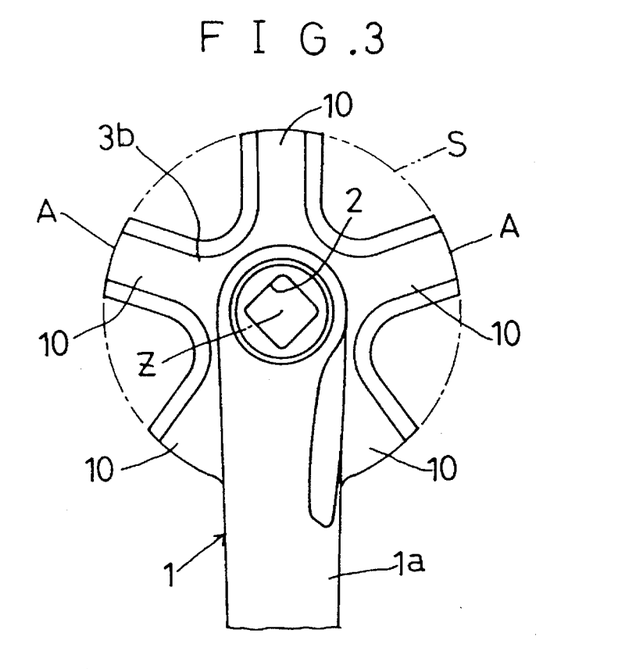
FIG. 3 is a front view of a boss of a crank arm.
Figure 4:
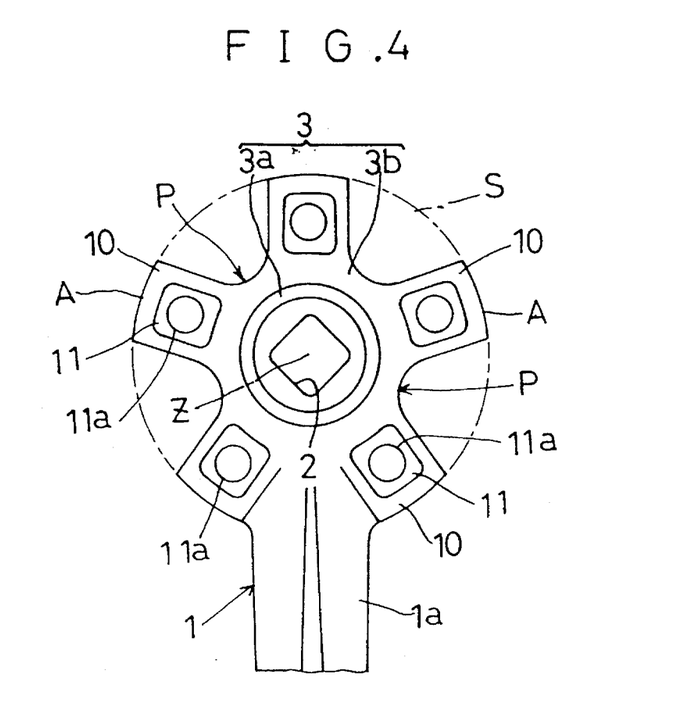
FIG. 4 is a back view of the boss of the crank arm.

For connecting the chain wheels 5–7 to the crank arm 1, as shown in FIGS. 3 and 4, the crank arm 1 includes five wheel mounting extensions 10 extending radially from the boss 3 about an axis Z of the crank axle connecting bore 2 in the boss 3. These extensions 10 are formed integral with the boss 3 by forging. Five wheel mounting pins 11 project inwardly of the bicycle from end regions of the extensions 10, respectively, which are formed integral with the extensions 10 by forging. The chain wheels 5–7 are connected through a connecting structure as shown in FIGS. 1 and 2.

Specifically, the low speed chain wheel 7 is secured at inner peripheries thereof tight to the wheel mounting pins 11 by mounting screws 12. The intermediate speed chain wheel 6 includes an annular portion defining teeth 6a, and five coupling legs 6b extending from the annular portion toward a rotational axis of the wheels. The coupling legs 6b are arranged opposite inward surfaces of the wheel mounting extensions 10, and tightened to the wheel mounting pins 11 by the mounting screws 12. The high speed chain wheel 5 includes an annular portion defining teeth 5a, and five coupling legs 5b extending from the annular portion toward the rotational axis of the wheels. The coupling legs 5b are arranged in a positional relationship with the wheel mounting extensions 10 as shown in FIG. 1. These coupling legs 5b are not connected to the wheel mounting extensions 10, but connected to the coupling legs 6b of the intermediate speed chain wheel 6 by coupling screws 13, respectively.

That is, the intermediate speed chain wheel 6 and low speed chain wheel 7 are connected tight to the wheel mounting extensions 10, to be attachable or detachable together in a single operation. Thus, the two chain wheels 6 and 7 share the same connecting structure for connection to the crank arm 1.

The high speed chain wheel 5 is connected to the intermediate speed chain wheel 6 without being connected to the crank arm 1. The high speed chain wheel 5 is connected to the crank arm 1 through the intermediate speed chain wheel 6, so that the high speed chain wheel 5 may be formed lightweight and the crank arm 1 may be reduced in size.

Specifically, the wheel mounting extensions 10 of the crank arm 1 define end surfaces A arranged inwardly toward the rotational axis from the screws 13 interconnecting the high speed chain wheel 5 and intermediate speed chain wheel 6. Even where end surfaces B of the coupling legs 5b of the high speed chain wheel 5 form a large inside diameter as in the prior art shown in FIG. 13, the wheel mounting extensions 10 may extend to a smaller extent from the boss of the crank arm 1 than in the prior art. That is, the high speed chain wheel 5 may be connected to the crank arm 1 even where the wheel mounting extensions 10 have a reduced length such that the end surfaces A of the wheel mounting extensions 10 describe a circle S having a diameter not exceeding 95mm.

Thus, although the coupling legs 5b of the high speed chain wheel 5 are not connected to the wheel mounting extensions 10 of the crank arm 1, the end surfaces A of the wheel mounting extensions 10 and the end surfaces B of the coupling legs 5b are arranged opposite and adjacent each other to provide for improvement in appearance and strength.

Figure 5:
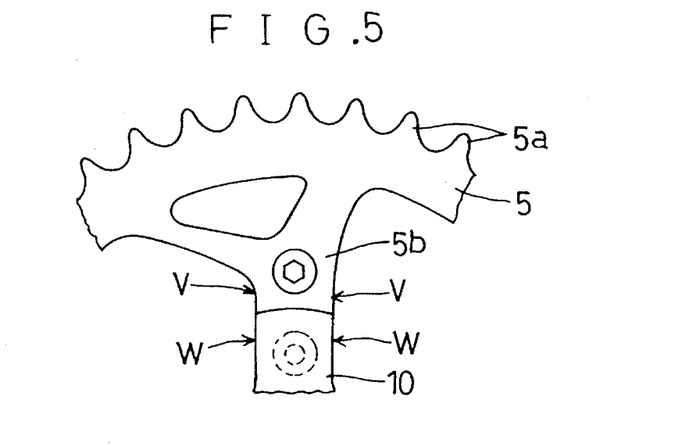
FIG. 5 is an explanatory view of a coupling leg and a wheel mounting extension arranged adjacent each other.
Figure 6:
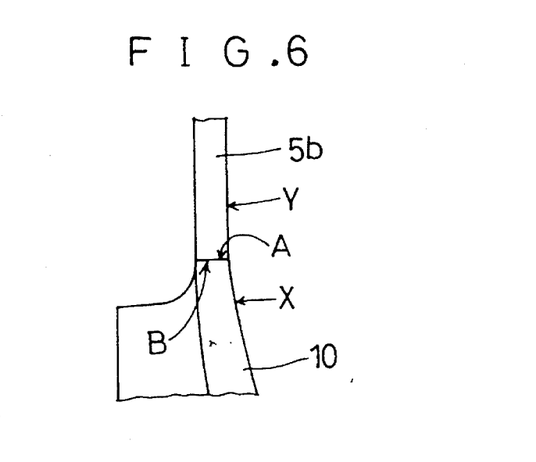
FIG. 6 is a further explanatory view of the coupling leg and wheel mounting extension arranged adjacent each other.

Where, as shown in FIG. 5, the end surfaces A and B are placed in contact with each other, a great drive load acting on the high speed chain wheel 5 is effectively received and borne by the crank arm 1 through the contact between the end surfaces A and B. Consequently, the high speed chain wheel 5 is not displaced toward the rotational axis under such a load. An improved outward appearance may be attained by shaping the wheel mounting extensions 10 and coupling legs 5b as shown in FIGS. 5 and 6. In FIG. 6, outer lateral surfaces X of the wheel mounting extensions 10 are smoothly continuous with outer lateral surfaces Y of the coupling legs 5b. Further, in FIG. 5, side surfaces W of the wheel mounting extensions 10, as seen in a direction along the rotational axis of the wheels, are smoothly continuous with side surfaces V of the coupling legs 5b.

Figure 7:
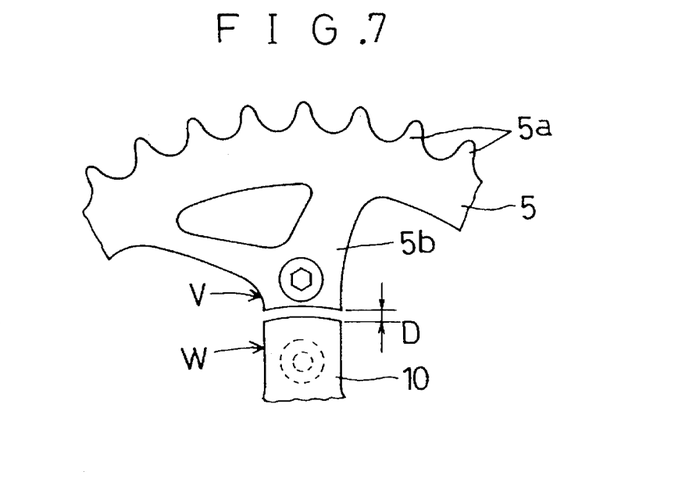
FIG. 7 is a further explanatory view of the coupling leg and wheel mounting extension arranged adjacent each other.
Figure 8:
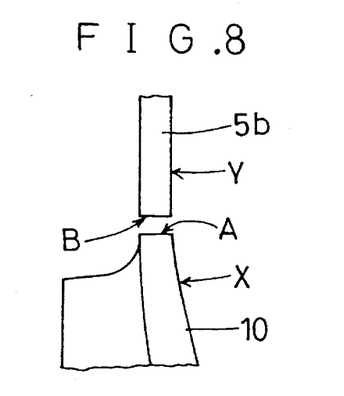
FIG. 8 is a further explanatory view of the coupling leg and wheel mounting extension arranged adjacent each other.

As shown in FIG. 7, the end surfaces A and B may be spaced from each other by a distance D not exceeding 3mm. Then, as in FIG. 8, the outer lateral surfaces X of the wheel mounting extensions 10 and outer lateral surfaces Y of the coupling legs 5b appear smoothly continuous with each other despite the space D therebetween. The side surfaces W of the wheel mounting extensions 10 and side surfaces V of the coupling legs 5b, as in FIG. 7, also appear continuous with each other, to present an excellent outward appearance.

Figure 9:
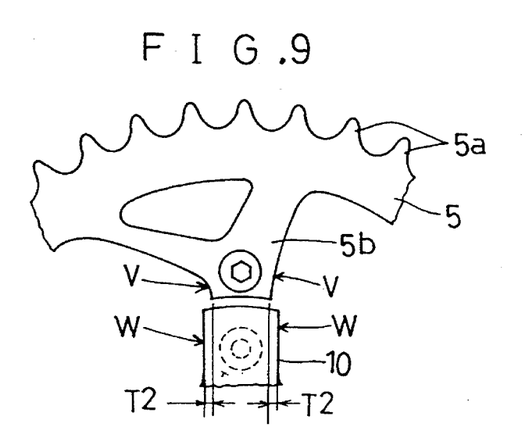
FIG. 9 is a further explanatory view of the coupling leg and wheel mounting extension arranged adjacent each other.
Figure 10:
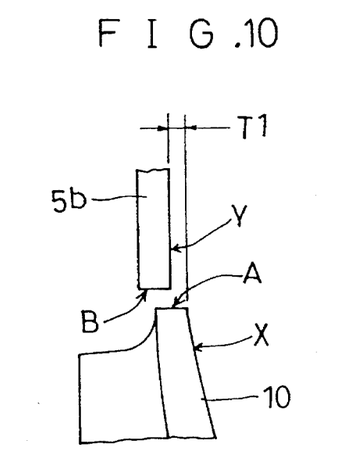
FIG. 10 is an explanatory view of the coupling leg and wheel mounting extension arranged with a space therebetween.
Figure 11:
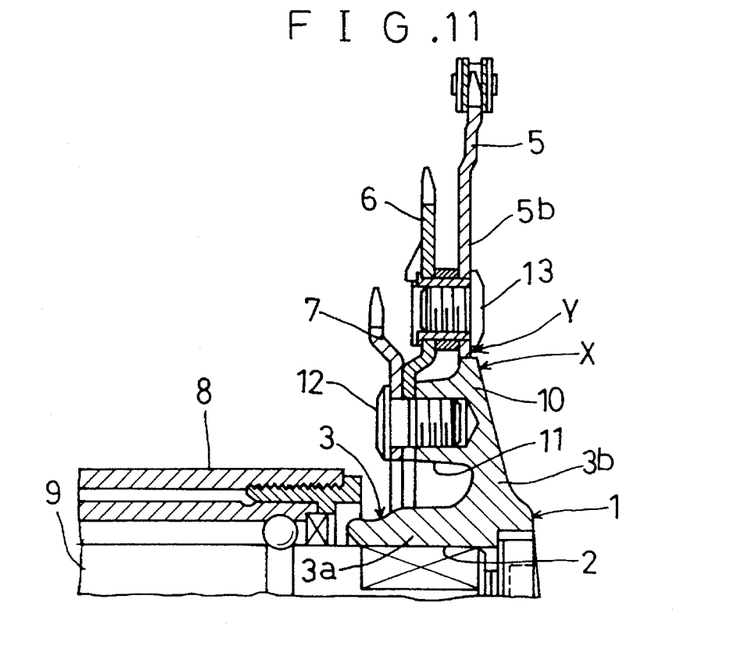
FIG. 11 is a sectional view of a chain wheel assembly in another embodiment of the invention.

In the two arrangements described above, a slight offset T1 may be allowed, as in FIGS. 10 and 11, between the outer lateral surfaces X of the wheel mounting extensions 10 and outer lateral surfaces Y of the coupling legs 5b. Similarly, a slight offset T2 may be allowed, as in FIG. 9, between the side surfaces W of the wheel mounting extensions 10 and side surfaces V of the coupling legs 5b. In either case, an appearance of smooth continuation may be secured by limiting the offset T1 or T2 to 3 mm.

As shown in FIG. 2, each wheel mounting pin 11 defines a bottomed thread hole 11a opening only to the inward surface of the wheel mounting extension 10. That is, the thread hole 11a does not extend to the front surface of the crank arm 1. Thus, the front surface of the crank arm 1 has a simple, neat appearance.

As shown in FIG. 4, the wheel mounting pins 11 are arranged in positions closer than positions P where the wheel mounting extensions 10 are connected to the flange portion 3b of the boss 3, to tip ends of the wheel mounting extensions 10. Consequently, relatively large spaces are secured between the tubular portion 3a and wheel mounting pins 11 although the wheel mounting extensions 10 have a relatively small length from the boss 3. This arrangement provides relatively large operating spaces adjacent the wheel mounting pins 11 for facility of an operation to attach the chain wheels 6 and 7. Moreover, the tubular portion 3a may have a relatively large wall thickness to attain a rigid connection to the crank axle 9.

Figure 12:
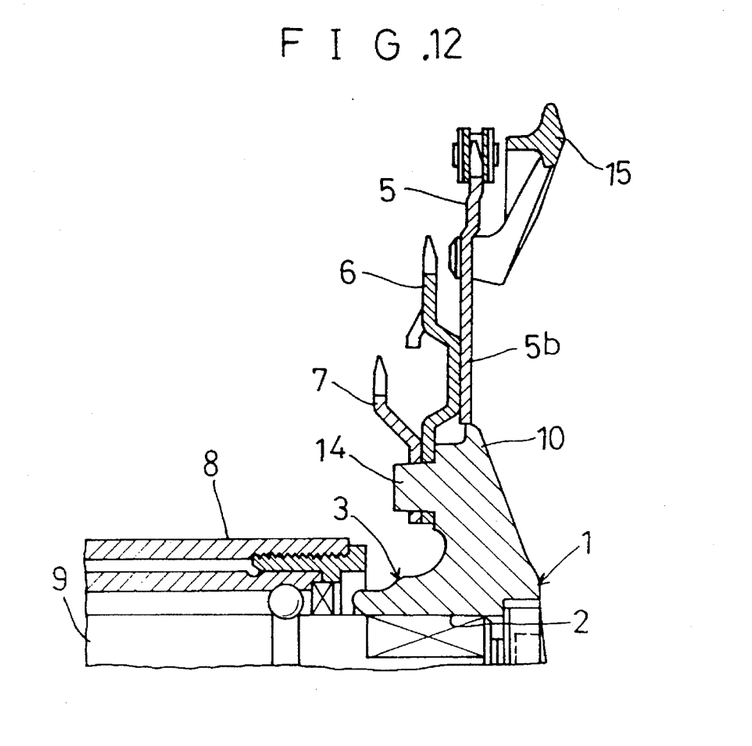
FIG. 12 is a sectional view of a chain wheel assembly in a further embodiment of the invention.

FIG. 12 shows a chain wheel assembly in a different embodiment of the invention.

In this embodiment, the high speed chain wheel 5 has coupling legs 5b welded to the intermediate speed chain wheel 6. The intermediate speed chain wheel 6 and low speed chain wheel 7 are tightened to the wheel mounting extensions 10 by caulking heads of wheel mounting pins 14 of the crank arm 1.

The high speed chain wheel 5 shown in FIG. 12 has a chain guide 15.

In the foregoing embodiments, the end surfaces A of the wheel mounting extensions 10 and the end surfaces B of the coupling legs 5b are opposed to each other. Instead, the ends of the wheel mounting extensions 10 may be displaced from the ends of the coupling legs 5b outwardly of the high speed chain wheel 5, such that the end surfaces A and B are equidistant from the axis Z and arranged along the rotational axis of the chain wheels. Further, the ends of the wheel mounting extensions 10 and coupling legs 5b may be slightly displaced from each other both radially and axially. In any case, the object of the present invention may be fulfilled by arranging the end surfaces A of the wheel mounting extensions 10 in contact with or slightly spaced from the coupling legs 5b of the high speed chain wheel 5, the end surfaces A being closer to the rotational axis of the chain wheels than are the connections between the high speed chain wheel 5 and intermediate speed chain wheel 6.

The present invention is applicable also to a chain wheel assembly providing two speeds instead of three. That is, the invention is applicable to a chain wheel assembly having at least one large chain wheel, and at least one smaller chain wheel.

What is claimed is:

1. A chain wheel assembly for a bicycle comprising:

a large chain wheel;

a small chain wheel;

a crank arm for supporting said large chain wheel and said small chain wheel, said crank arm having:

an arm body;

a boss for connecting said crank arm to a crank axle of said bicycle; and wheel mounting extensions extending radially outwardly from said boss and including first connecting means for connecting said small chain wheel;

second connecting means arranged radially outwardly of said first connecting means for connecting said large chain wheel to said small chain wheel, said large chain wheel being connected only to said small chain wheel through said second connecting means.

2. A chain wheel assembly as defined in claim 1, wherein said large chain wheel includes coupling legs for connection to said small chain wheel, said coupling legs defining first end surfaces facing radially inwardly, said wheel mounting extensions defining second end surfaces facing radially outwardly, said first end surfaces and said second end surfaces being in contact with each other.

3. A chain wheel assembly as defined in claim 2, wherein outer lateral surfaces of said wheel mounting extensions are smoothly continuous with outer lateral surfaces of said coupling legs adjacent positions of contact between said first end surfaces and said second end surfaces.

4. A chain wheel assembly as defined in claim 2, wherein side surfaces of said wheel mounting extensions, as seen in a direction along a rotational axis of said large chain wheel and said small chain wheel, are smoothly continuous with side surfaces of said coupling legs adjacent positions of contact between said first end surfaces and said second end surfaces.

5. A chain wheel assembly as defined in claim 1, wherein said large chain wheel includes coupling legs for connection to said small chain wheel, said coupling legs defining first end surfaces facing radially inwardly, said wheel mounting extensions defining second end surfaces facing radially outwardly, said first end surfaces and said second end surfaces being arranged adjacent and out of contact with each other.

6. A chain wheel assembly as defined in claim 1 wherein said small chain wheel is an intermediate speed chain wheel, said chain wheel assembly further comprising a low speed chain wheel smaller than said intermediate speed chain wheel, said intermediate chain wheel and said low speed chain wheel being connected tight together to said wheel mounting extensions.

7. A chain wheel assembly as defined in claim 1, wherein said first connecting means are pins projecting inwardly from said wheel mounting extensions and defining bottomed thread holes opening only to inward surfaces of said wheel mounting extensions.

8. A chain wheel assembly as defined in claim 1, wherein said first connecting means are pins projecting inwardly from said wheel mounting extensions and having heads caulked to connect said small chain wheel as engaged therewith to said wheel mounting extensions.

9. A chain wheel assembly as defined in claim 1, wherein five of said wheel mounting extensions extend integrally with said boss and radially from an axis of said boss, said wheel mounting extensions defining end surfaces describing an imaginary circle having a diameter up to 95 mm.

* * * * *